(12) United States Patent
Zhang et al.

(10) Patent No.: US 11,092,448 B2
(45) Date of Patent: Aug. 17, 2021

(54) SYSTEM AND METHOD FOR DETERMINING ROUTING BY LEARNED SELECTIVE OPTIMIZATION

(71) Applicant: Alipay Labs (Singapore) Pte. Ltd., Singapore (SG)

(72) Inventors: Xingwen Zhang, San Mateo, CA (US); Shuang Yang, San Mateo, CA (US)

(73) Assignee: Alipay Labs (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/023,182

(22) Filed: Sep. 16, 2020

(65) Prior Publication Data

US 2020/0408541 A1    Dec. 31, 2020

Related U.S. Application Data

(63) Continuation of application No. 16/827,519, filed on Mar. 23, 2020, now Pat. No. 10,809,080.

(51) Int. Cl.
*G01C 21/34* (2006.01)
*G01C 21/00* (2006.01)
(Continued)

(52) U.S. Cl.
CPC ....... *G01C 21/343* (2013.01); *G01C 21/3446* (2013.01); *G06K 9/6256* (2013.01); *G06N 3/08* (2013.01); *G06N 20/00* (2019.01)

(58) Field of Classification Search
CPC .... G01C 21/343; G01C 21/3446; G06N 3/08; G06N 20/00; G06K 9/6256
See application file for complete search history.

(56) References Cited

U.S. PATENT DOCUMENTS 6,182,014 B1    1/2001   Kenyon et al.
6,418,398 B1    7/2002   Dueck et al.
(Continued)

FOREIGN PATENT DOCUMENTS

CN     110135641 A    8/2019
CN     110853349 A    2/2020

OTHER PUBLICATIONS

Anonymous Authors "Learning (Re-) Starting Solutions for Combinatorial Optimization", International Conference on Machine Learning, 8 pages.
(Continued)

*Primary Examiner* — Tyler J Lee

(57) ABSTRACT

Methods, systems, and apparatus, including computer programs encoded on computer storage media, for determining routing. An exemplary method comprises: inputting a plurality of to-be-optimized routing solution candidates to a Siamese neural network comprising a plurality of value prediction networks, each of the value prediction networks being trained to predict a cost associated with a to-be-optimized routing solution candidate; identifying one or more to-be-optimized routing solution candidates from the plurality of to-be-optimized routing solution candidates based on outputs of the Siamese neural network; inputting the one or more identified to-be-optimized routing solution candidates to a routing optimizer to obtain one or more optimized routing solution candidates; and determining an optimized routing solution with a lowest cost from the one or more optimized routing solution candidates.

19 Claims, 9 Drawing Sheets

(51) Int. Cl.
*G06K 9/62* (2006.01)
*G06N 20/00* (2019.01)
*G06N 3/08* (2006.01)

(56) References Cited

U.S. PATENT DOCUMENTS

| | | | |
|---|---|---|---|
| 6,427,114 | B1 | 7/2002 | Olsson |
| 7,020,147 | B1 | 3/2006 | Amadon et al. |
| 7,340,535 | B1 | 3/2008 | Alam |
| 7,693,653 | B2 | 4/2010 | Hussain et al. |
| 9,037,406 | B2 | 5/2015 | Mason et al. |
| 9,494,937 | B2 | 11/2016 | Siegel et al. |
| 9,587,954 | B2 | 3/2017 | Gusikhin et al. |
| 9,672,465 | B2 | 6/2017 | Sandeep et al. |
| 9,940,729 | B1 | 4/2018 | Kwant et al. |
| 10,386,192 | B1 | 8/2019 | Konrardy et al. |
| 2016/0300186 | A1 | 10/2016 | Scharaswak et al. |
| 2017/0008521 | A1 | 1/2017 | Braunstein et al. |
| 2017/0185087 | A1 | 6/2017 | Petroff |
| 2017/0192437 | A1 | 7/2017 | Bier et al. |
| 2017/0262790 | A1 | 9/2017 | Khasis |
| 2018/0292824 | A1 | 10/2018 | Kazemi et al. |
| 2019/0087744 | A1* | 3/2019 | Schiemenz ............ G06N 20/00 |
| 2019/0146508 | A1* | 5/2019 | Dean ................... G05D 1/0274 701/26 |
| 2019/0147320 | A1 | 5/2019 | Mattyus et al. |
| 2019/0212155 | A1* | 7/2019 | Gordon ................. G01C 21/20 |
| 2019/0332935 | A1 | 10/2019 | Sanchez Bermudez et al. |
| 2020/0026954 | A1 | 1/2020 | Rhodes et al. |
| 2020/0103894 | A1* | 4/2020 | Cella ..................... G06N 3/088 |
| 2020/0104966 | A1* | 4/2020 | Cella ..................... G06N 3/08 |
| 2020/0192350 | A1* | 6/2020 | Cella ..................... G06N 3/086 |
| 2020/0232802 | A1 | 7/2020 | Zhang et al. |

OTHER PUBLICATIONS

Bengio et al., "Machine Learning for Combinatorial Optimization: a Methodological Tour d'Horizon", Arvix, 2018, Computer Science, Mathematics, 47 pages.
Bromley et al., "Signature Verification using a "Siamese" Time Delay Neural Network", Proceedings of the 6th International Conference on Neural Information Processing Systems, Nov. 1993, p. 737-744.
Chen et al., "Learning to Perform Local Rewriting for Combinatorial Optimization", 33rd Conference on Neural Information Processing Systems, Oct. 2019, 20 pages.
Cybenko, G. "Correction Approximation by Superpositions of a Sigmodial Function", Mathematics of Control, Signals, and Systems, 1989, vol. 2, p. 303-314.
Dantzig et al., "The Truck Dispatching Problem", Management Science, Oct. 1959, vol. 6, No. 1, p. 80-91.
Glover et al., "Tabu Search—Part 1 ", ORSA journal on Computing, 1989, vol. 1, p. 135-206.
Google Al, OR-Tools, 4 pages, downloaded on Apr. 17, 2020 from https://developers.google.com/optimization/.
Helsgaun, K. "An Extension of the Lin-Kernighan-Helsgaun TSP Solver for Constrained Traveling Salesman and Vehicle Routing Problems", Technical Report, Roskilde University, 2017, 60 pages.
Kirkpatrick et al., "Optimization by Simulated Annealing", Science, May 1983, vol. 220, Issue 4598, p. 671-680.
Kool et al., "Attention, Learn to Solve Routing Problems!", International Conference on Learning Representatives, Feb. 2019, 25 pages.
Leshno et al., "Multilayer Feedforward Networks with a Nonpolynomial Activation Function Can Approximate Any Function", Neural Networks, 1993, vol. 6, p. 861-867.
Lu et al., "A Learning-Based Iterative Method for Solving Vehicle Routing Problems", International Conference on Learning Representations, 2020, 15 pages.
Nazari et al., "Reinforcement Learning for Solving the Vehicle Routing Problem", Advances in Neural Information Processing Systems, 2018, p. 9839-9849.
Toth et al., "Models, relaxations and exact approaches for the capacitated vehicle routing problem", Discrete Applied Mathematics, 2002, vol. 123, p. 487-512.
Vaswani et al., "Attention is all you need", 31st Conference on Neural Information Processing Systems, 2017, 15 pages.
Wikipedia "Vehicle routing problem", last edited Apr. 15, 2020, retrieved from https://en.wikipedia,org/wiki/Vehicie_muting_probiem.
Wikipedia, "Operations research", last edited Mar. 11, 2020, retrieved from https://en.wikipedia.org/wiki/Operations_research.
Non-Final Office Action dated May 19, 2020, issued in related U.S. Appl. No. 16/827,519 (6 pages).
Written Opinion and International Search Report for PCT Application No. PCT/CN2021/074501 dated Apr. 26, 2021.

\* cited by examiner

SYSTEM AND METHOD FOR DETERMINING ROUTING BY LEARNED SELECTIVE OPTIMIZATION

CROSS REFERENCE TO RELATED APPLICATION

The present application is a continuation application of U.S. patent application Ser. No. 16/827,519, filed Mar. 23, 2020. The entire content of the above-referenced application is incorporated herein by reference.

TECHNICAL FIELD

This application generally relates to systems and methods for determining routing and, in particular, to systems and methods for determining routing by identifying promising routing solution candidates and selectively optimizing the identified routing solution candidates.

BACKGROUND

Routing optimization is a process aimed to determine a routing solution with optimal cost based on a finite set of routing solution candidates. The classic traveling salesman problem (TSP) and vehicle routing problem (VRP) are some exemplary variants of the routing optimization problem. Real-world applications of routing optimization may be found in areas such as telecommunications network design, task scheduling, transportation system planning, energy, finance, and supply chain. Routing optimization problems involving finding efficient routes for vehicles are commonly referred to as VRP. There are several variants of VRP, including VRP with pickup and delivery (VRPPD), VRP with Last-In-First-Out, VRP with Time Windows (VRPTW), and Capacitated VRP (CVRP).

In a typical routing optimization situation, an optimal routing solution may include a plurality of routes to travel through N given locations with various constraints. Finding the optimal routing solution is challenging because even for a small value of N, the total number of candidate routes is exceedingly large. It has been well-established that determining the optimal solution to VRP is NP-hard. In practice, a number of routing solution candidates (e.g., randomly selected routings) may be used as starting points, and optimized by a routing optimizer to obtain a number of optimized routing solutions, from which the one with the lowest cost may be identified. Since each routing solution candidate may only lead the optimizer to explore a small portion of the search space (e.g., the solution space), it is necessary to apply the optimizer to a large number of routing solution candidates to find the optimal routing solution. However, applying the optimizer is usually costly in time and computing resources. Therefore, it is desirable to provide a method for determining the optimal routing by intelligently identifying the promising routing solution candidates for optimization.

SUMMARY

Various embodiments of the specification include, but are not limited to, systems, methods, and non-transitory computer readable media for determining routing.

According to some embodiments, a computer-implemented method for determining routing may comprise: inputting a plurality of to-be-optimized routing solution candidates to a Siamese neural network comprising a plurality of value prediction networks, each of the value prediction networks being trained to predict a cost associated with a to-be-optimized routing solution candidate; identifying one or more to-be-optimized routing solution candidates from the plurality of to-be-optimized routing solution candidates based on outputs of the Siamese neural network; inputting the one or more identified to-be-optimized routing solution candidates to a routing optimizer to obtain one or more optimized routing solution candidates; and determining an optimized routing solution with a lowest cost from the one or more optimized routing solution candidates.

In some embodiments, each to-be-optimized routing solution candidate of the plurality of to-be-optimized routing solution candidates comprises one or more routes for routing one or more vehicles through a plurality of locations, and is subject to one or more constraints, the constraints comprising one or more of the following: time constraint; travel distance constraint; vehicle capacity constraint; and power expense constraint.

In some embodiments, the routing optimizer comprises a set of improvement operators learned based on a reinforcement learning algorithm, and the set of improvement operators perform operations comprising one or more of following: changing an order of at least two of the plurality of locations in one of the one or more routes; and moving a location from one of the one or more routes to another one of the one or more routes.

In some embodiments, the plurality of value prediction networks in the Siamese neural network are identical.

In some embodiments, the Siamese neural network comprises two value prediction networks, and the method further comprises: training the two value prediction networks by performing one or more iterations of a tuning process, wherein the performing one or more iterations of a tuning process comprises: obtaining a training set comprising a third to-be-optimized routing solution candidate and a fourth to-be-optimized routing solution candidate; inputting the training set to the routing optimizer to obtain a third score for the third to-be-optimized routing solution candidate and a fourth score for the fourth to-be-optimized routing solution candidate; inputting the training set to the two value prediction networks respectively to obtain a fifth score for the third to-be-optimized routing solution candidate and a sixth score for the fourth to-be-optimized routing solution candidate; and tuning weights of the two value prediction networks based at least on the third score, the fourth score, the fifth score, and the sixth score.

In some embodiments, prior to the inputting the training set to the two value prediction networks, the tuning process further comprises: determine whether a difference between the third score and the fourth score is greater than a preset threshold; and if not, abandoning the third to-be-optimized routing solution candidate and the fourth to-be-optimized routing solution candidate.

In some embodiments, the tuning weights of the two value prediction networks comprises: determining a label for the training set based on the third score and the fourth score; converting the fifth score and the sixth score to a fifth logit value and a sixth logit value; determining a cross-entropy loss function based on the label, the fifth logit value and the sixth logit value; and tuning weights of the two value prediction networks based on the cross-entropy loss function.

In some embodiments, each of the plurality of value prediction networks comprises: a bidirectional Long Short-Term Memory (LSTM) layer comprising a plurality of LSTM units; an attention layer for embedding outputs from the plurality of LSTM units; and an output layer for generating a score based on an output from the attention layer and a plurality of features associated with a to-be-optimized routing solution candidate.

In some embodiments, the to-be-optimized routing solution candidate comprises a plurality of routes, each route being associated with a distance, and the plurality of features associated with the to-be-optimized routing solution candidate comprises: a sum of the distances of the plurality of routes in the to-be-optimized routing solution candidate; and a standard deviation of the distances of the plurality of routes in the to-be-optimized routing solution candidate.

In some embodiments, the Siamese neural network comprises two value prediction networks, and the inputting a plurality of to-be-optimized routing solution candidates to a Siamese neural network comprises: for each to-be-optimized routing solution candidate of the plurality of the to-be-optimized routing solution candidates: pairing the to-be-optimized routing solution candidate with each other to-be-optimized routing solution candidate of the plurality of to-be-optimized routing solution candidates that is different from the to-be-optimized routing solution candidate; and inputting the to-be-optimized routing solution candidate and the paired each other candidate into the two value prediction networks to determine an individual score of the to-be-optimized routing solution candidate.

In some embodiments, the inputting the to-be-optimized routing solution candidate and the paired each other to-be-optimized routing solution candidate into the two value prediction networks to determine an individual score of the to-be-optimized routing solution candidate comprises: obtaining a seventh score for the to-be-optimized routing solution candidate and an eighth score for the paired each other to-be-optimized routing solution candidate; determining a positive score for the to-be-optimized routing solution candidate if the seventh score is greater than the eighth score; and determining a non-positive score for the to-be-optimized routing solution candidate if the seventh score is not greater than the eighth score.

In some embodiments, the identifying one or more to-be-optimized routing solution candidates from the plurality of to-be-optimized routing solution candidates based on the Siamese neural network comprises: for each to-be-optimized routing solution candidate of the plurality of the to-be-optimized routing solution candidates: determining an overall score for the to-be-optimized routing solution candidate comprising a sum of the individual scores of the to-be-optimized routing solution candidate; and identifying a to-be-optimized routing solution candidate from the plurality of to-be-optimized routing solution candidates with a highest overall score.

According to other embodiments, a system for determining routing comprises one or more processors and one or more computer-readable memories coupled to the one or more processors and having instructions stored thereon that are executable by the one or more processors to perform operations comprising: inputting a plurality of to-be-optimized routing solution candidates to a Siamese neural network comprising a plurality of value prediction networks, each of the value prediction networks being trained to predict a cost associated with a to-be-optimized routing solution candidate; identifying one or more to-be-optimized routing solution candidates from the plurality of to-be-optimized routing solution candidates based on outputs of the Siamese neural network; inputting the one or more identified to-be-optimized routing solution candidates to a routing optimizer to obtain one or more optimized routing solution candidates; and determining an optimized routing solution with a lowest cost from the one or more optimized routing solution candidates.

According to yet other embodiments, a non-transitory computer-readable storage medium for determining routing is configured with instructions executable by one or more processors to cause the one or more processors to perform operations comprising: inputting a plurality of to-be-optimized routing solution candidates to a Siamese neural network comprising a plurality of value prediction networks, each of the value prediction networks being trained to predict a cost associated with a to-be-optimized routing solution candidate; identifying one or more to-be-optimized routing solution candidates from the plurality of to-be-optimized routing solution candidates based on outputs of the Siamese neural network; inputting the one or more identified to-be-optimized routing solution candidates to a routing optimizer to obtain one or more optimized routing solution candidates; and determining an optimized routing solution with a lowest cost from the one or more optimized routing solution candidates.

Embodiments disclosed herein have one or more technical effects. In some embodiments, the methods and systems comprise a Learn to Restart (L2R) module to screen a plurality of routing solution candidates to help a black-box optimization agent (BOA) to initialize or to restart as to navigate through the search space towards desirable solutions. Based on the screening results, BOA may selectively optimize (e.g., selective optimization) a smaller number of routing solution candidates and avoid wasting computing resources and time on optimizing those unpromising candidates. In some embodiments, the L2R module comprises two identical trained value prediction networks that each provides an approximate value surface (e.g., similar to that of a continuous optimization problem) over the search space implicitly defined by the BOA. In other words, assuming the BOA returns an optimized routing solution $X^*$ after optimizing a given to-be-optimized routing solution candidate $X^0$ (denoted as $X^*|X^0$), the L2R module may be trained to predict the function of $X^*|X^0$ using a value prediction network, without actually running the BOA. In some embodiments, the trained value prediction network may be used as a weak learner to build the L2R module through mechanisms such as boosting in order to accurately identify "promising" to-be-optimized candidates. For example, by applying the training value prediction network multiple times on various combinations of routing solution candidates, the L2R module may determine the most "promising" routing solution candidate with fair accuracy for BOA to optimize.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Figure 1:
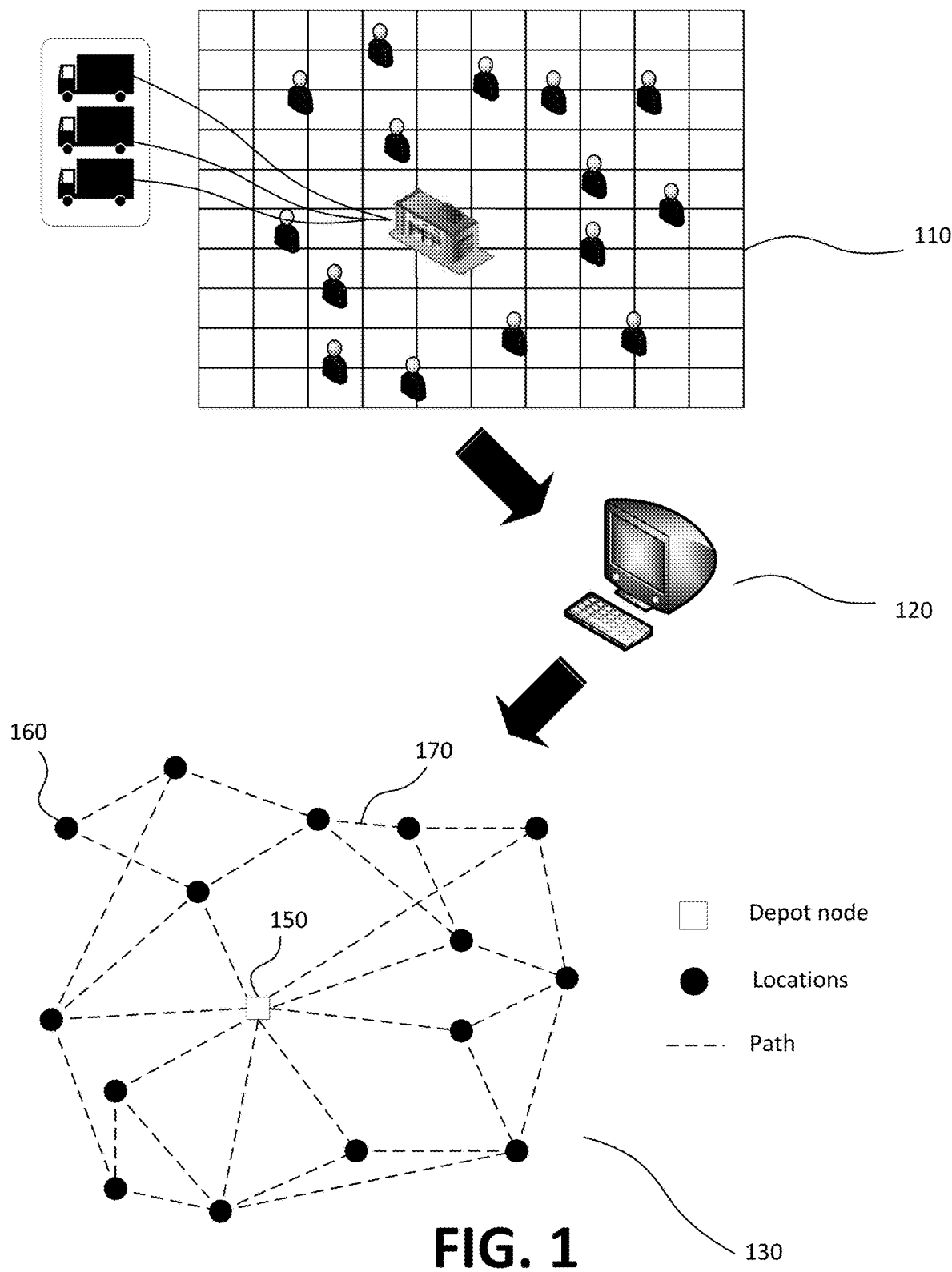
FIG. 1 illustrates an environment associated with a routing problem or its variant instance in accordance with some embodiments.

Capacitated Vehicle Routing Problem (CVRP) and its variants may be formulated as combinatorial problems (NP-hard). A key challenge in solving combinatorial optimization problems is how to guide a solution searching agent (e.g., solver) to efficiently explore the enormous search space. Conventional approaches often rely on enumeration (e.g., exhaustive, random, or tabu search) or iterative procedure (e.g., iteratively exploring the search space from a given starting point). These approaches are far from satisfactory as they are either enumerative and thus only a small portion of the space can be explored within a feasible budget of time and compute, or they have to restrict the exploration to very limited regions.

Embodiments described herein provide methods, systems, and apparatus for effectively determining routing. In some embodiments, a value prediction network may be trained to screen routing solution candidates before actually exploring the search space. The value prediction network may provide an approximate value surface over the search space (e.g., solution search space) that is implicitly defined by a black-box optimization agent used in a given CVRP problem. From a plurality of routing solution candidates, the value prediction network may select the "promising" routing solution candidates and abandon those "non-promising" ones. A "promising" routing solution candidate may refer to a starting point for the BOA to actually navigate through the search space towards desirable solutions, and have a higher probability to be optimized to a point with optimal cost (e.g., a cost being lower than a preset value). In this specification, BOA and routing optimizer are used interchangeably.

A determined optimal routing solution may be provided to navigate one or more vehicles for visiting a plurality of locations in an area. The vehicles may include car, trucks, trains, boats, drones, robots, airplanes, etc. The vehicles may visit the locations for various purposes, such as picking up and/or delivering goods and/or passengers. The locations may be connected by roads, highways, air routes, waterways, or the like for routing the vehicles. In some embodiments, an optimal routing solution for an instance (VRP or its variant) in an environment may be obtained. For example, the environment may be a community, a city, a state, a country, or another suitable geographic area. A routing solution in such an environment may include a collection of routes for the vehicles to travel along. Traveling along each route may incur a traveling cost.

The routing solution may be subject to a threshold (e.g., a budget) for the cost and may be subject to certain constraints, such as time, travel distance, vehicle weight, size, range, another constraint, or any combination thereof. Optimizing the routing solution may comprise minimizing the cost, while complying with the constraints. Both the traveling cost and constraints may be instance-specific. In a business setting, a service provider may, based on an optimal routing solution corresponding to the environment, plan estimated delivery time, dispatch service vehicles, or assign routes for delivery vehicles accordingly. For instance, a logistics company may need to move a number of goods from one or more pickup locations to one or more delivery locations, with a goal of finding optimal routes for a fleet of vehicles to visit the pick and drop-off locations. For another instance, a delivery company may have to make deliveries with a fleet of vehicles of limited load capacities. For yet another instance, a delivery company may have time constraints within which the deliveries must be made to the delivery locations. The optimal routing solution may need to be identified within a predetermined time window to ensure compliance with the time constraints. In some cases, the time window may be a few seconds or even milliseconds for determining a fastest route immediately after a user inputs a navigation request into a map application. In some other cases, the time window may be a few minutes or even a few hours for planning optimal delivery routes for the next day's deliveries. Alternatively, in some embodiments, the environment may comprise an integrated circuit on which an optimal wiring solution is to be determined similarly as the routing solution.

FIG. 1 illustrates an environment associated with a routing problem or its variant instance in accordance with some embodiments. In some embodiments, an instance 110 comprises one or more warehouses 101, a plurality of locations 180 (such as houses waiting for deliveries from the one or more warehouses, or requesting pick-ups by the one or more warehouses), and one or more vehicles 102 that may visit the plurality locations through various routes. Each route may navigate along one or more roads, highways, air routes, waterways, other suitable channels connecting at least two locations, or any combination thereof. The goal of routing optimization may be to search for an optimal routing solution in order to minimize the traveling cost for the vehicles, while satisfying various constraints, such as time, travel distance, vehicle weight, size, range, power (e.g., gasoline, electricity) expense, another constraint, or any combination thereof. Both the traveling cost and constraints may be instance-specific.

In some embodiments, the environment may include a computing system 120 comprising one or more computing devices such as servers in a server cluster. The computing system 120 may obtain and represent the instance 110 as a computer-readable data structure 130. The data structure 130 may include a depot node 150 corresponding to the warehouse, a plurality of locations 160 corresponding to the plurality of locations 180, and a plurality of paths 170 among the locations 160. The plurality of paths 170 may be associated with features related to traveling cost (e.g., distances, tolls, traffics), road conditions, speed limits, number of traffic lights and stop signs, etc. A route under a routing solution (e.g., route 190) may start from a starting point such as the depot 150, include one or more of the plurality of paths 170 that are connected to one another, and cover one or more of the plurality of locations 160. Each path 170 may allow traffic in one-way or both directions. Each location 160 may be associated with a number of features including static features and dynamic features. Static features may be independent from the routing solution and include, for example, location information (e.g., map coordinates or address of a location 160), demand information (e.g., number of packages to be delivered or for pick-up, total size or weight of the packages, a soft or hard estimated-time-of-arrival for delivery or pick-up), another suitable information, or any combination thereof. Dynamic features may be routing solution-specific and include, for example, the position information associated with one or more neighboring locations along the route under a current routing solution, a remaining capacity of a vehicle leaving a location, another suitable information, or any combination thereof.

In some embodiments, the computing system 120 may determine one or more routing solutions (e.g., an optimal routing) based on the data structure 130 and/or other information. An example of a routing solution is described below with reference to FIG. 2. The computing system 120 may provide the one or more routing solutions to the one or more vehicles 102 (e.g., in-vehicle computer), one or more computing devices (e.g., computer 103 of a routing control center, mobile phone 104 of vehicle driver), or the like for effectuating the routing. In the environment, each of the systems and devices may be installed with appropriate software (e.g., application program interface) and/or hardware (e.g., wires, wireless connections) to access other devices of the environment. In general, the systems and devices may be able to communicate with one another through one or more wired or wireless networks (e.g., the Internet) through which data can be communicated. Each of the systems and devices may include one or more processors and one or more memories coupled to the one or more processors. The memories may be non-transitory and computer-readable and configured with instructions executable by one or more processors to cause the one or more processors to perform operations described herein. The instructions may be stored in the memories or downloaded over a communications network without necessarily being stored in the memories. Although the systems and devices are shown as separate components in this figure, it will be appreciated that these devices can be implemented as single devices or multiple devices coupled together.

Figure 2:
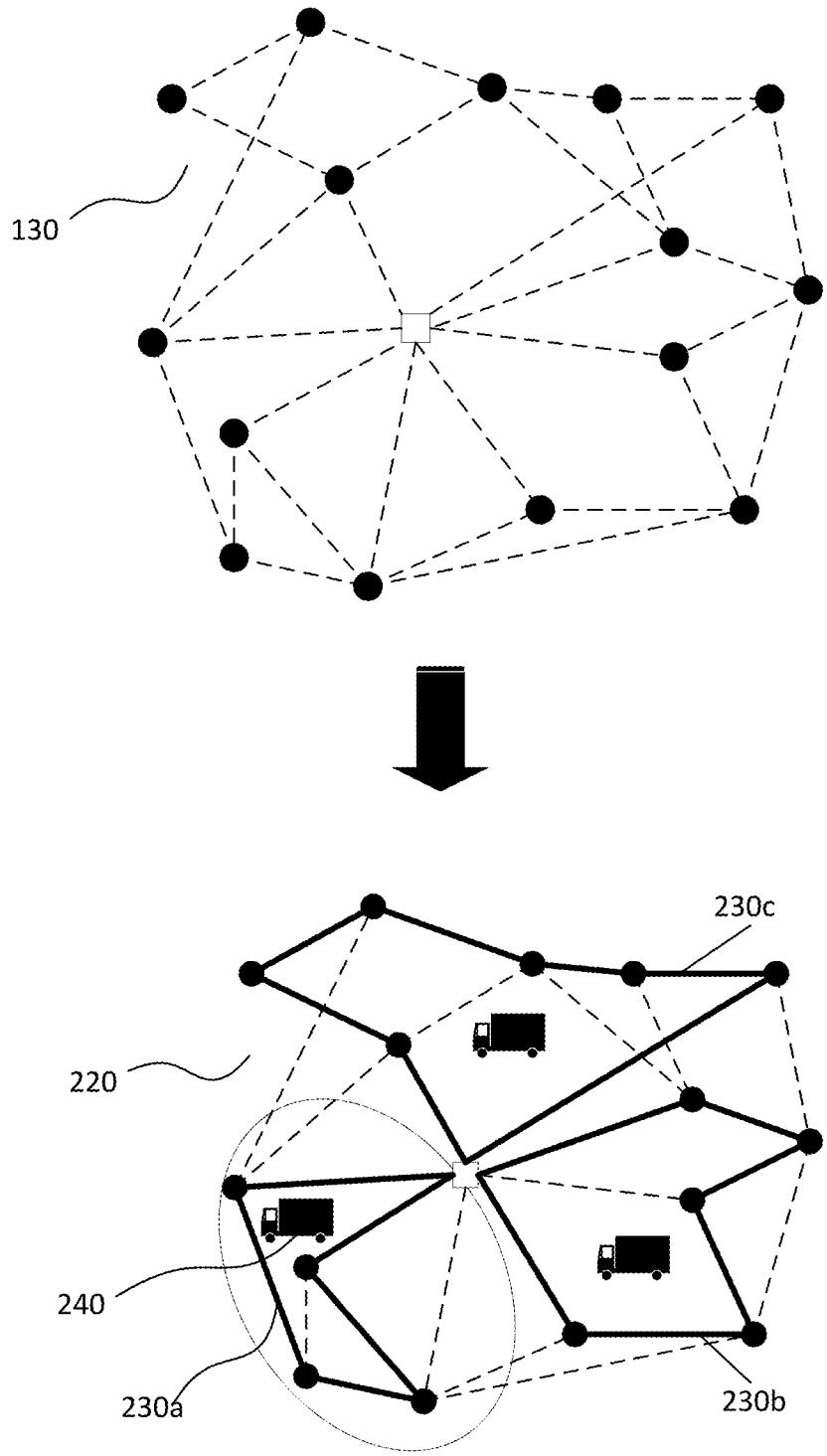
FIG. 2 illustrates an example of a routing solution for a routing problem or its variant instance in accordance with some embodiments.

FIG. 2 illustrates an example of a routing solution for a routing problem or its variant instance in accordance with some embodiments. Taking the instance (represented by the computer-readable data structure 130) in FIG. 1 as an example, a corresponding routing solution 220 may be required to satisfy one or more instance-specific constraints such as time constraint, travel distance constraint, vehicle capacity constraint, and power expense constraint. For example, a company may require some of the users to be serviced by the end of the day (e.g., the buyers have ordered same-day shipping), then the routing solution may be determined to include one or more routes such that the vehicles 240 are able to visit all these users by the end of the day. As shown, three vehicles 240 may cover all locations respectively via route 230*a*, route 230*b*, and route 230*c*.

Determining the one or more routes may take into account the locations of the users, the traffic information, vehicle's capacities (size limit, weight limit, range limit), features of the packages to be serviced (such as frozen items, fragile items, size, weight), another suitable information, or any combination thereof. For another example, a service provider may require the expense for servicing all users to be lower than a predetermined budget. The expense may include power expense (such as gasoline expense, electricity expense, other type of energy expenses, or any combination thereof), labor expense (such as drivers' salaries, food, lodging, another type of expense, or any combination thereof), toll, another type of expense, or any combination thereof. A routing solution for such service provider may be determined to include one or more routes (230*a*, 230*b*, 230*c*) such that the total expense of the solution (sum of the expenses associated with each route) is lower than the budget. The expense associated with each route may have other constraints such as time, travel distance, vehicle weight, size, range, power (e.g., gasoline, electricity) expense, another constraint, or any combination thereof. In some embodiments, the vehicles 240 are uniform with respect to vehicle capacity, condition, fuel efficiency. In other embodiments, the vehicles 240 may be heterogeneous with respect to vehicle capacity, condition, fuel efficiency. In some embodiments, the instance 110 may have multiple constraints to satisfy. For instance, the instance 110 may have a first budget for the number of vehicles to be utilized, a second budget for the time to service, and a third budget for the total monetary expense. For example, the cost constraint is to use no more than 5 vehicles and deliver 100 packages by the end of the day, with the lowest traveling fuel and labor expenses.

Figure 3:
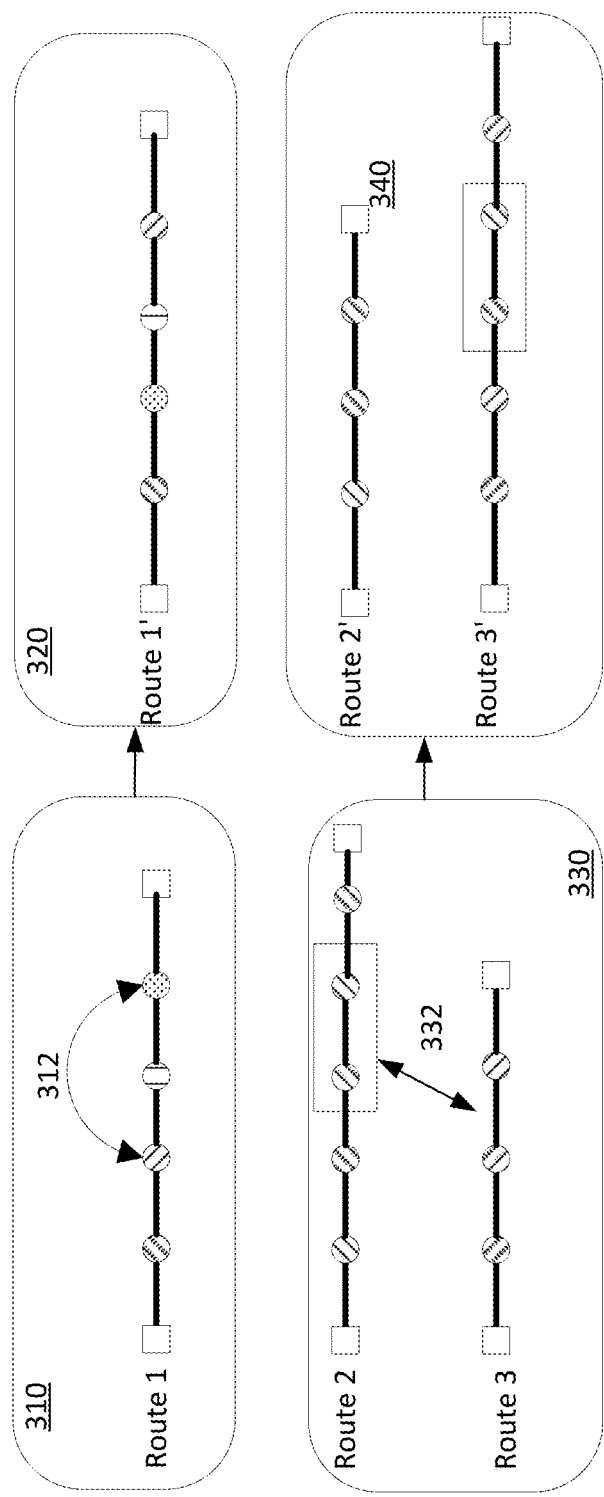
FIG. 3 illustrates exemplary operations for optimizing a routing solution in accordance with some embodiments.

FIG. 3 illustrates exemplary operations for optimizing a routing solution in accordance with some embodiments. As shown in FIG. 3, the operations may include changing an order of at least two of the plurality of locations in one of the one or more routes, and moving a location from one of the one or more routes to another one of the one or more routes. For example, route 1 in box 310 is updated to route 1' in box 320 after an "exchange" action 312 is applied. Thus, two of the plurality of locations exchange their positions (order of service) in the route. In another example, the route 2 and route 3 in box 330 are updated to route 2' and route 3' in box 340 after an "move" action 332 is applied. Thus, two locations of route 2 are relocated into route 3. Although only one action is shown for each improvement action here, an improvement action may include one or more "exchange" actions, one or more "move" actions, other suitable actions, or any combination thereof.

The two operations illustrated in FIG. 3 are exemplary actions that the BOA may select to optimize a given to-be-optimized routing solution candidate. In some embodiments, the BOA may include a state-action policy that is trained based on a reinforcement learning (RL) algorithm to identify an optimal action from an action pool to perform in response to a given state of the environment. In the context of VRP problems, the action pool may include a plurality of optimization actions (e.g., including the two operations shown in FIG. 3 and other suitable operations); the state of the environment may include the current routing solution, some historic data (such as X improvement actions that lead to the current routing solution, and corresponding effects), other suitable information, or any combination thereof. The trained policy may guide the BOA to keep optimizing a given routing solution candidate until convergence (e.g., the solution may not be further optimized). It may be noted that this convergence may refer to a "local" convergence within the searching space.

Figure 4:
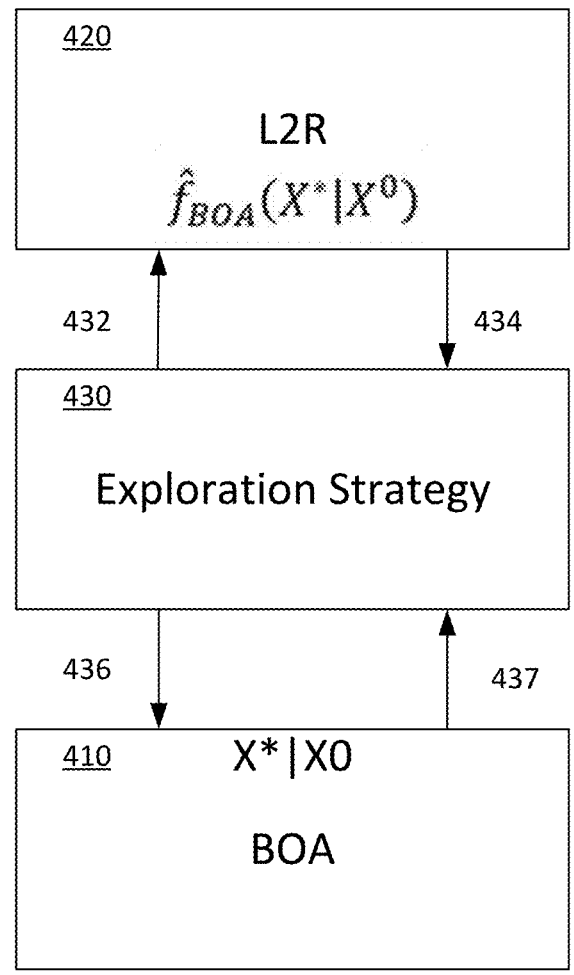
FIG. 4 illustrates an exemplary system diagram for determining routing in accordance with some embodiments.

FIG. 4 illustrates an exemplary system diagram for determining routing in accordance with some embodiments. The components in the system 400 in FIG. 4 may include a black-box optimization agent (BOA) module 410, a learn-to-restart (L2R) module 420 (hereafter, L2R 420), and an exploration strategy module 430. Depending on the implementation, the system 400 may have more, less, or alternative components as shown in FIG. 4.

In some embodiments, the BOA module 410 may be presumed as a classical optimizer (e.g., an RL-trained agent) that takes a to-be-optimized routing solution candidate $X^0$ of a VRP instance, optimizes it and returns $X^*$ (e.g., the optimized routing may be denoted as $X^*|X^0$, indicating the solution is optimized based on $X^0$). This specification does not limit how the BOA 410 is trained. An exemplary training method is described in FIG. 2.

In some embodiments, the L2R 420 may be configured to approximate the behavior of the BOA 410 for a given routing solution candidate. For example, for a to-be-optimized routing solution candidate $X^0$ of a VRP instance, the BOA 410 may implicitly define a search space; the L2R 420 may be trained to approximate a value surface within the search space and predict the objective function value of $X^*|X^0$ using a value prediction network, without actually running the BOA. The predicted value may be denoted as:

$$\hat{f}_{BOA}(X^*|X^0)$$

For a plurality of to-be-optimized routing solution candidates, $\hat{f}_{BOA}(X^*|X^0)$ may predict which of them may lead to a better resultant routing solution produced by the BOA 410 (e.g., after being optimized by the BOA, the optimized version provides an optimal cost). In some embodiments, the L2R 420 may be trained offline and be used to screen a large number of routing solution candidates before the "promising" ones are fed to the BOA 410 for actual optimization.

The L2R 420 may be implemented in various ways. In some embodiments, in response to a given routing solution candidate, the L2R 420 may be trained to predict the final routing cost (e.g., a distance, a time) associated with the routing solution candidate after being optimized by the BOA (but without actually running the BOA). In some embodiments, the L2R 420 may be trained to identify one out of a plurality of routing solution candidates being most "promising" without the need to accurately predict the after-optimization routing costs for the plurality of routing solution candidates. For example, the L2R 420 may simply be trained to identify one routing solution candidate that is better (e.g., greater likelihood to be optimized to a better solution) than the other one.

In some embodiments, the exploration strategy module 430 in FIG. 4 coordinates the interaction between the BOA 410 and the L2R 420. For example, the exploration strategy module 430 may first obtain a group of to-be-optimized routing solution candidates corresponding to a routing instance, and feed them to L2R 420 for screening at step 432. In some embodiments, the L2R 420 may include a value prediction network to approximate the searching behavior of the BOA 410, and may approximately predict how far a given to-be-optimized routing solution candidate may be optimized and/or estimate how "promising" each of the to-be-optimized routing solution candidates is. Subsequently, the exploration strategy 430 may, based on the screening results from L2R 420, identify a subset of the group of to-be-optimized routing solution candidates for the BOA 410 to actually optimize. For example, the L2R 420 may directly return the subset at step 434, or it may return scores of the group of to-be-optimized routing solution candidates for the exploration strategy 430 to determine the subset to be sent to the BOA 410 at step 436. After the BOA 410 optimizes the selected routing solution candidates, one optimized routing solution with the lowest cost may be identified at step 437.

In some embodiments, the exploration strategy 430 may also be configured to explore some to-be-optimized routing solution candidates before executing the above-described process. For example, the exploration strategy 430 may first generate one or more random routing solutions, which may yield totally unpredictable costs. These random routing solutions may be sent to the BOA 410 for optimization. After the BOA 410 returns the optimized versions of the random routing solutions after convergences, the exploration strategy 430 may perturbate the optimized versions in various ways to generate a group of to-be-optimized routing solution candidates (e.g., an optimized version may become a to-be-optimized candidate after each perturbation). For the sake of simplicity, the to-be-optimized routing solution candidates generated by perturbing an optimized routing solution may be referred to as "offspring" of the optimized routing solution. These "offspring" may guide the BOA 410 to explore different regions in the search space to explore desirable routing solutions.

Figure 5:
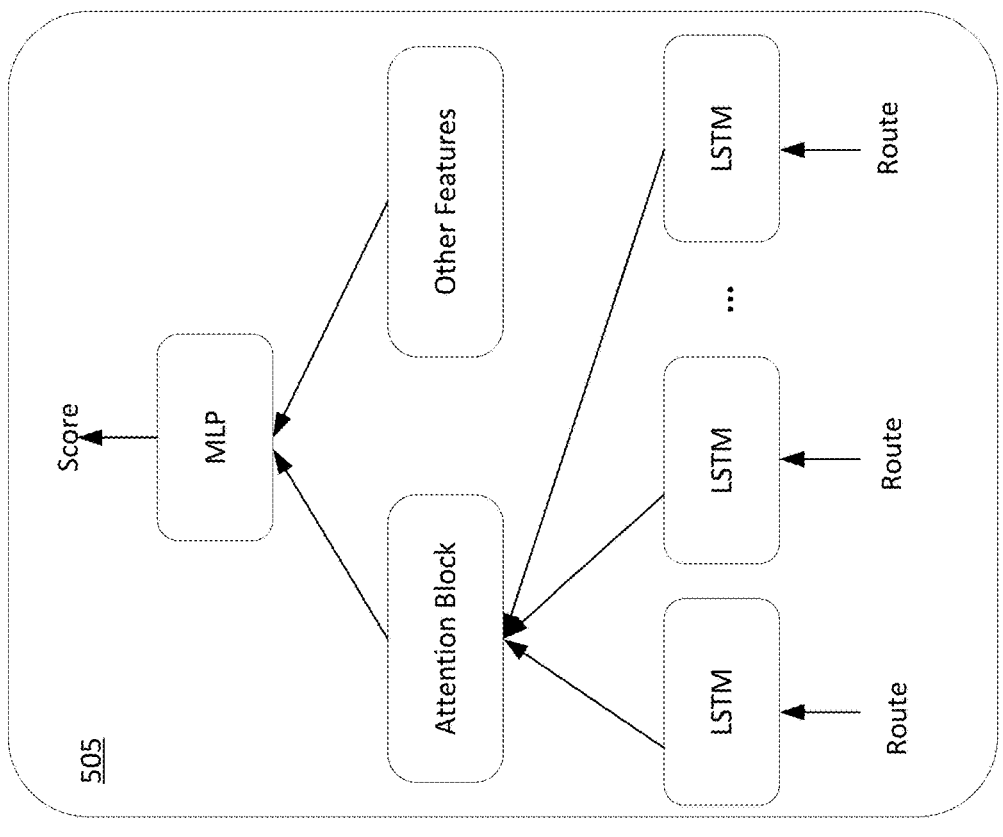
FIG. 5 illustrates an exemplary value prediction network for determining routing in accordance with some embodiments.
Figure 5:
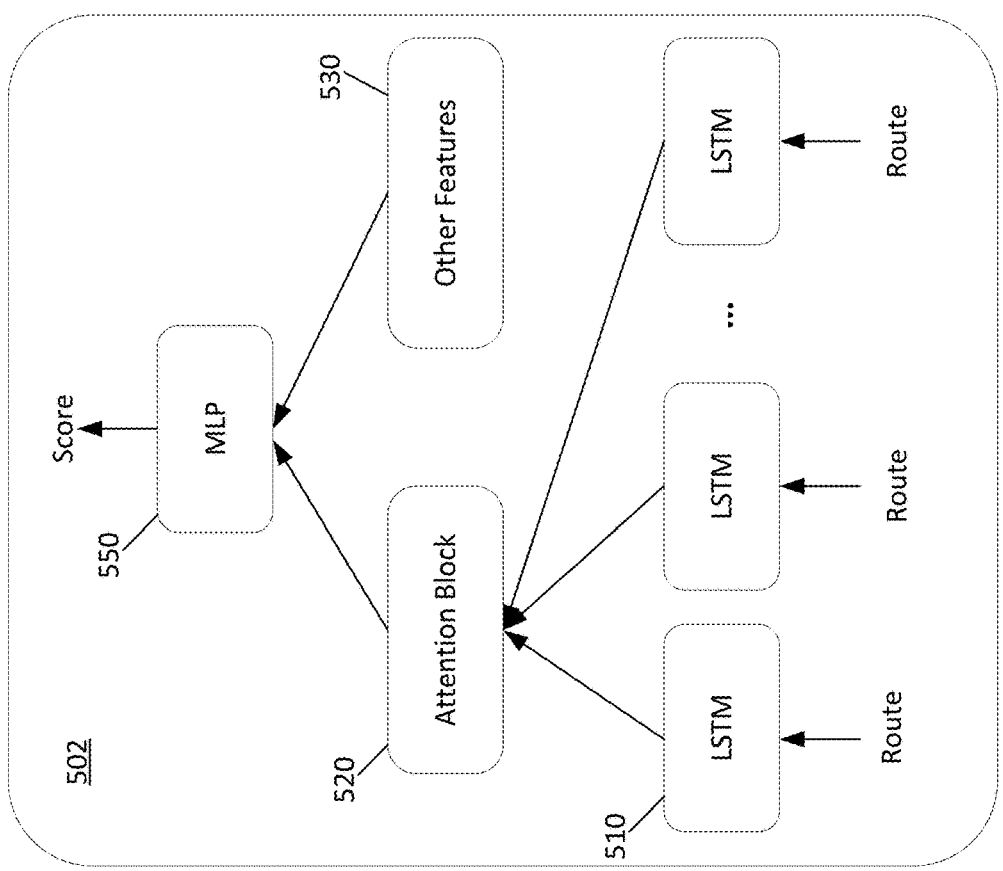

In some embodiments, the L2R 420 module may comprise a value prediction network in a form of Siamese neural network as shown in FIG. 5.

FIG. 5 illustrates an exemplary value prediction network for determining routing in accordance with some embodiments. The value prediction network in FIG. 5 may refer to a Siamese neural network that comprises two identical neural networks 502 and 505 (e.g., sharing the same weights/parameters/structures). For each pair of to-be-optimized routing solution candidates, the Siamese neural network may be trained to predict which to-be-optimized solution may lead to a lower cost (e.g., shorter travel distance) after being optimized by the BOA 401.

In some embodiments, each of the neural networks 502 and 505 may comprise a bidirectional long short-term memory (LSTM) layer with a plurality of LSTM units 510, followed by a fully connected layer. LSTM-based networks are well-suited for classifying, processing and making predictions based on time series data. Here, in the context of VRP, a routing solution may comprise a plurality of routes, with each route comprising a time series corresponding to a travel plan (e.g., visiting a plurality of locations by a vehicle within a time window). In some embodiments, each route in a routing solution may be represented as a sequence of nodes corresponding to a plurality of customers. Each node may include customer-specific features of a corresponding customer such as location, demand, as well as features about the neighboring customers (e.g., the distance from the previous node and the distance to the next node). As shown in FIG. 5, for a given routing solution, each of the routes therein may first be fed into a LSTM block 510 for embedding.

Subsequently, the LSTM embedding of each route may be concatenated and fed into an attention layer 520, which may include a number of attention stacks. In some embodiments, the output (e.g., embedding) of the attention block 520 may be sent to a multilayer perceptron layer (MLP) 550 to produce a score for the input routing solution (e.g., a to-be-optimized routing solution candidate). In some embodiments, besides the output of the attention layer 520, the MLP 550 may also take into account a plurality of solution-specific features 530 associated with the input routing solution, such as a sum and a standard deviation of the distances of the routes in the routing solution. These solution-specific features may be appended to the embedding produced by the attention layer 520 for the MLP 550 to produce the score for the input routing solution. Here, the score may be a representation of a predicted cost associated with a hypothetically optimized version of the input routing solution.

The training data for training the neural networks 502 and 505 may be obtained in various ways. In some embodiments, because different VRP instances may have different instance-specific features, a number of VRP instances may be sampled so that the trained neural networks may be automatically adaptive to different VRP instances. For each VRP instance, at least two to-be-optimized routing solutions may be randomly sampled as a piece of training sample and then individually sent to BOA 410 for optimization. The resultant costs may be used to label the piece of training sample (e.g., the pair of to-be-optimized routing solutions). For example, if a first to-be-optimized routing solution yields a lower cost, the piece of training sample may be labeled as 1, otherwise it may be labeled as 0.

In some embodiments, in order to obtain high quality (e.g., more representative) training samples, the pair of to-be-optimized routing solutions may be abandoned if a difference between the corresponding resultant costs is less than a predetermined threshold. In some embodiments, the process to obtain the training data may be performed offline and in parallel. For example, multiple CPUs may be used (e.g., each CPU or each core on a CPU may host a BOA) if the BOA needs no GPU.

In some embodiments, the training process may be described as follow: obtaining a training set comprising a third to-be-optimized routing-candidate and a fourth to-be-optimized routing-candidate; inputting the training set to the routing optimizer (e.g., BOA) to obtain a third score for the third to-be-optimized routing-candidate and a fourth score for the fourth to-be-optimized routing-candidate; inputting the training set to the two value prediction networks respectively to obtain a fifth score for the third to-be-optimized routing-candidate and a sixth score for the fourth to-be-optimized routing-candidate; and tuning weights of the two value prediction networks base at least on the third score, the fourth score, the fifth score, and the sixth score.

During the training process, each piece of training sample may be fed into the neural networks 502 and 505 to obtain the corresponding scores (e.g., the fifth score and the sixth score). Based on the obtained scores, a probability that the first routing solution in the training sample is more "promising" than the other one may be obtained. This probability may be compared with the above-mentioned label associated with the piece of training sample to determine a loss. For example, the obtained scores may be transformed to two logit values, and a cross-entropy loss function may be defined as:

$$\text{loss} = -\sum_{s \in S} (y_s * \log(p_s) + (1 - y_s) * \log(1 - p_s))$$

Where S is the set of training samples, $y_s$ is the label for the training sample s, and $p_s$ is the predicted probability that the first routing solution in the training sample is more "promising" than the other one may be obtained. In some embodiments, each of the neural networks 502 and 505 may be trained using adaptive moment estimation (ADAM) with a learning rate of 0.0005.

It may be appreciated that although the Siamese neural network described in FIG. 5 includes two individual networks 502 and 505, it may include three of more networks depending on the implementation preferences and application scenarios. Assuming the Siamese neural network includes three networks, the training samples to be collected may need to include three to-be-optimized route solutions, and the labeling of each training sample may be adjusted accordingly. For example, if the first solution in the sample obtains a score that is greater than both of the other two solutions, the training sample may be labeled with 2; if the first solution in the sample obtains a score that is greater than only one of the other two solutions, it may be labeled as 1; otherwise, it may be labeled as 0.

Figure 6:
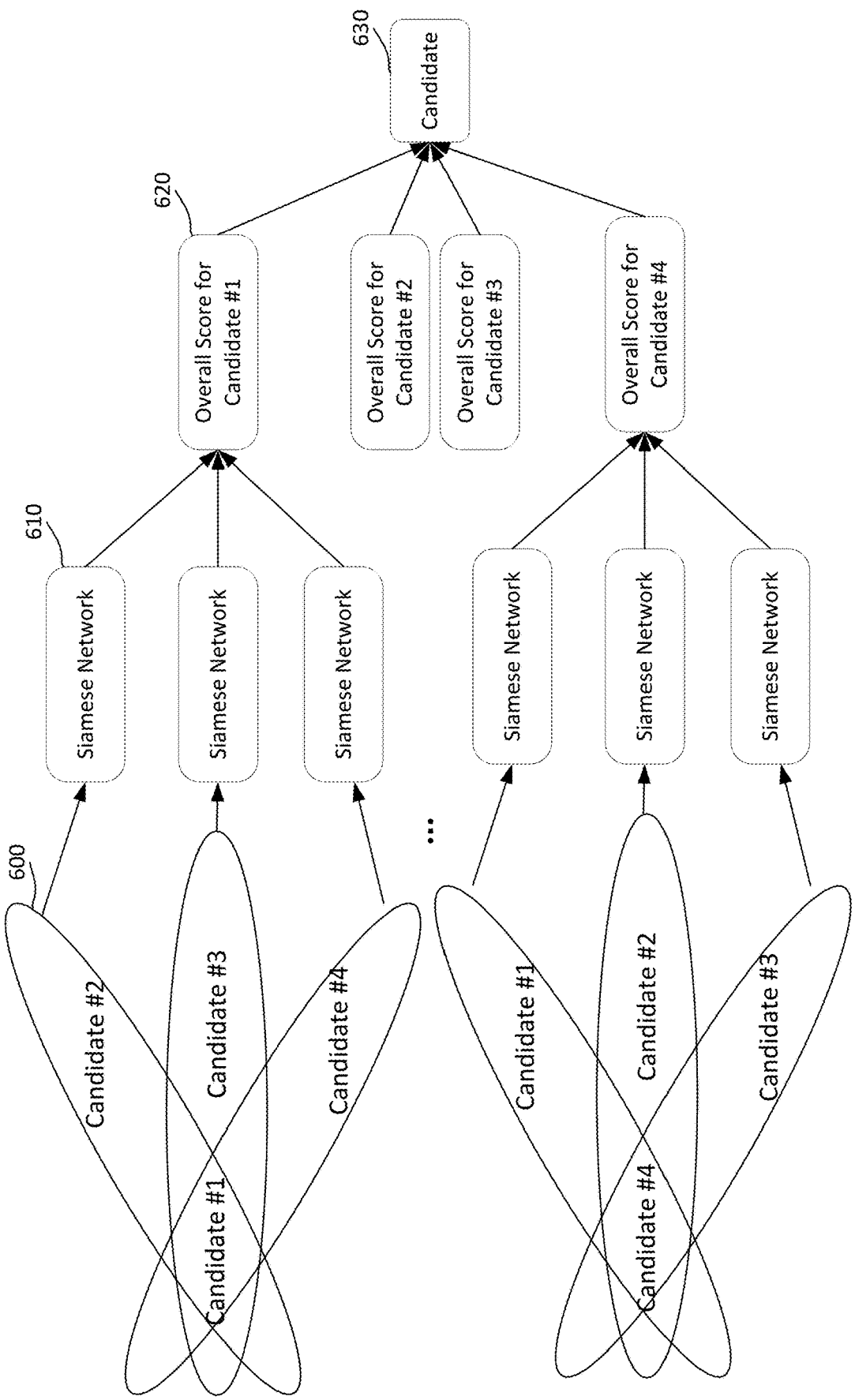
FIG. 6 illustrates an exemplary application of a trained value prediction network for determining routing in accordance with some embodiments.

FIG. 6 illustrates an exemplary application of a trained value prediction network for determining routing in accordance with some embodiments. The trained value prediction network 610 may be referred to as the Siamese neural network described in FIG. 5 that includes two trained neural networks. The exemplary application in FIG. 6 may start with inputting a plurality of to-be-optimized routing solution candidates to the Siamese network 610 with following method: for each candidate of the plurality of the to-be-optimized routing solution candidates, pairing the candidate with each other candidate of the plurality of to-be-optimized routing solution candidates that is different from the candidate; and inputting a pair of the candidate and the each other candidate into the two value prediction networks to determine an individual score of the candidate.

As shown in FIG. 6, for a given set of four routing solution candidates, candidate #1, candidate #2, candidate #3, and candidate #4, each of the candidates may be paired with another candidate to form a pair 600. For example, candidate #1 may be paired with the other three candidates to form three pairs. Each of the three pairs may then be fed into the Siamese Network 610, which may generate two scores for the each pair. For example, when the pair of candidate #1 and candidate #2 is fed to the Siamese Network 610, two scores may be generated for candidate #1 and candidate #2 respectively. If candidate #1's score is greater than candidate #2's score, candidate #1 may obtain a positive individual score for "winning" the comparison (e.g., being more "promising" than candidate #2 according to the trained Siamese Network 610). As a simple example, the positive individual score may be 1. If candidate #1 lost the comparison for being "less promising" than candidate #2, it may obtain a non-positive individual score, such as 0 or −1. In this example, candidate #1 may obtain three individual scores as it is involved in three comparisons (e.g., in three pairs).

Subsequently, each of the plurality of routing solution candidates may obtain an overall score 620 based on its received individual scores. For example, the overall score 620 for candidate #1 may be a sum of its three individual scores obtained from the Siamese Network 610. Finally, the routing solution candidate 630 with the highest overall score may be selected to be fed into the routing optimizer (e.g., the BOA) for actual optimization. The optimized version of the selected routing solution candidate may be determined as the optimal routing solution to be executed.

In some embodiments, instead of selecting one routing solution candidate with the highest overall score, a preset number of routing solution candidates with the top overall scores may be selected to be optimized by the routing optimizer. The final optimal routing solution may be identified from the preset number of optimized routing solutions.

Figure 7:
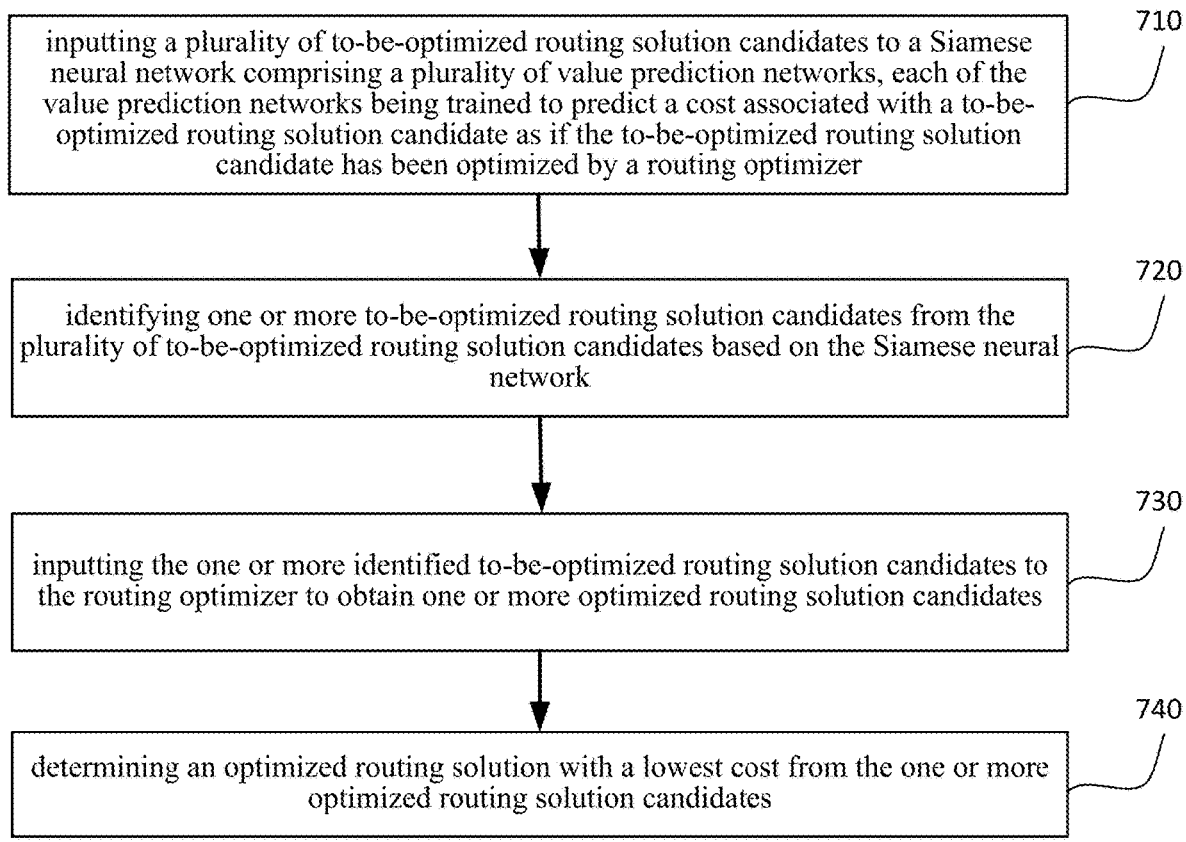
FIG. 7 illustrates an exemplary method for determining routing in accordance with some embodiments.

FIG. 7 illustrates an exemplary method 700 for determining routing in accordance with some embodiments. The method 700 may be implemented by the computing system 102 shown in FIG. 1, the system shown in FIG. 4, and correspond to embodiments illustrated in FIGS. 1-6.

Depending on the implementation, the method may have additional, fewer, or alternative steps.

Block 710 includes inputting a plurality of to-be-optimized routing solution candidates to a Siamese neural network comprising a plurality of value prediction networks, each of the value prediction networks being trained to predict a cost associated with a to-be-optimized routing solution candidate. In some embodiments, each to-be-optimized routing solution candidate of the plurality of to-be-optimized routing solution candidates comprises one or more routes for routing one or more vehicles through a plurality of locations, and is subject to one or more constraints, the constraints comprising one or more of the following: time constraint; travel distance constraint; vehicle capacity constraint; and power expense constraint. In some embodiments, the routing optimizer comprises a set of improvement operators learned based on a reinforcement learning algorithm, and the set of improvement operators perform operations comprising one or more of following: changing an order of at least two of the plurality of locations in one of the one or more routes; and moving a location from one of the one or more routes to another one of the one or more routes. In some embodiments, the plurality of value prediction networks in the Siamese neural network are identical.

Block 720 includes identifying one or more to-be-optimized routing solution candidates from the plurality of to-be-optimized routing solution candidates based on outputs of the Siamese neural network. In some embodiments, the Siamese neural network comprises two value prediction networks, and the inputting a plurality of to-be-optimized routing solution candidates to a Siamese neural network comprises: for each to-be-optimized routing solution candidate of the plurality of the to-be-optimized routing solution candidates: pairing the to-be-optimized routing solution candidate with each other to-be-optimized routing solution candidate of the plurality of to-be-optimized routing solution candidates that is different from the to-be-optimized routing solution candidate; and inputting the to-be-optimized routing solution candidate and the paired each other candidate into the two value prediction networks to determine an individual score of the to-be-optimized routing solution candidate. In some embodiments, the inputting the to-be-optimized routing solution candidate and the paired each other to-be-optimized routing solution candidate into the two value prediction networks to determine an individual score of the to-be-optimized routing solution candidate comprises: obtaining a seventh score for the to-be-optimized routing solution candidate and an eighth score for the paired each other to-be-optimized routing solution candidate; determining a positive score for the to-be-optimized routing solution candidate if the seventh score is greater than the eighth score; and determining a non-positive score for the to-be-optimized routing solution candidate if the seventh score is not greater than the eighth score. In some embodiments, the identifying one or more to-be-optimized routing solution candidates from the plurality of to-be-optimized routing solution candidates based on the Siamese neural network comprises: for each to-be-optimized routing solution candidate of the plurality of the to-be-optimized routing solution candidates: determining an overall score for the to-be-optimized routing solution candidate comprising a sum of the individual scores of the to-be-optimized routing solution candidate; and identifying a to-be-optimized routing solution candidate from the plurality of to-be-optimized routing solution candidates with a highest overall score.

Block 730 includes inputting the one or more identified to-be-optimized routing solution candidates to the routing optimizer to obtain one or more optimized routing solution candidates.

Block 740 includes determining an optimized routing solution with a lowest cost from the one or more optimized routing solution candidates.

In some embodiments, the Siamese neural network comprises two value prediction networks, and the method 700 further comprises: training the two value prediction networks by performing one or more iterations of a tuning process, wherein the performing one or more iterations of a tuning process comprises: obtaining a training set comprising a third to-be-optimized routing solution candidate and a fourth to-be-optimized routing solution candidate; inputting the training set to the routing optimizer to obtain a third score for the third to-be-optimized routing solution candidate and a fourth score for the fourth to-be-optimized routing solution candidate; inputting the training set to the two value prediction networks respectively to obtain a fifth score for the third to-be-optimized routing solution candidate and a sixth score for the fourth to-be-optimized routing solution candidate; and tuning weights of the two value prediction networks based at least on the third score, the fourth score, the fifth score, and the sixth score. In some embodiments, prior to the inputting the training set to the two value prediction networks, the tuning process further comprises: determine whether a difference between the third score and the fourth score is greater than a preset threshold; and if not, abandoning the third to-be-optimized routing solution candidate and the fourth to-be-optimized routing solution candidate. In some embodiments, the tuning weights of the two value prediction networks comprises: determining a label for the training set based on the third score and the fourth score; converting the fifth score and the sixth score to a fifth logit value and a sixth logit value; determining a cross-entropy loss function based on the label, the fifth logit value and the sixth logit value; and tuning weights of the two value prediction networks based on the cross-entropy loss function. In some embodiments, each of the plurality of value prediction networks comprises: a bidirectional Long Short-Term Memory (LSTM) layer comprising a plurality of LSTM units; an attention layer for embedding outputs from the plurality of LSTM units; and an output layer for generating a score based on an output from the attention layer and a plurality of features associated with a to-be-optimized routing solution candidate. In some embodiments, the to-be-optimized routing solution candidate comprises a plurality of routes, each route being associated with a distance, and the plurality of features associated with the to-be-optimized routing solution candidate comprises: a sum of the distances of the plurality of routes in the to-be-optimized routing solution candidate; and a standard deviation of the distances of the plurality of routes in the to-be-optimized routing solution candidate.

Figure 8:
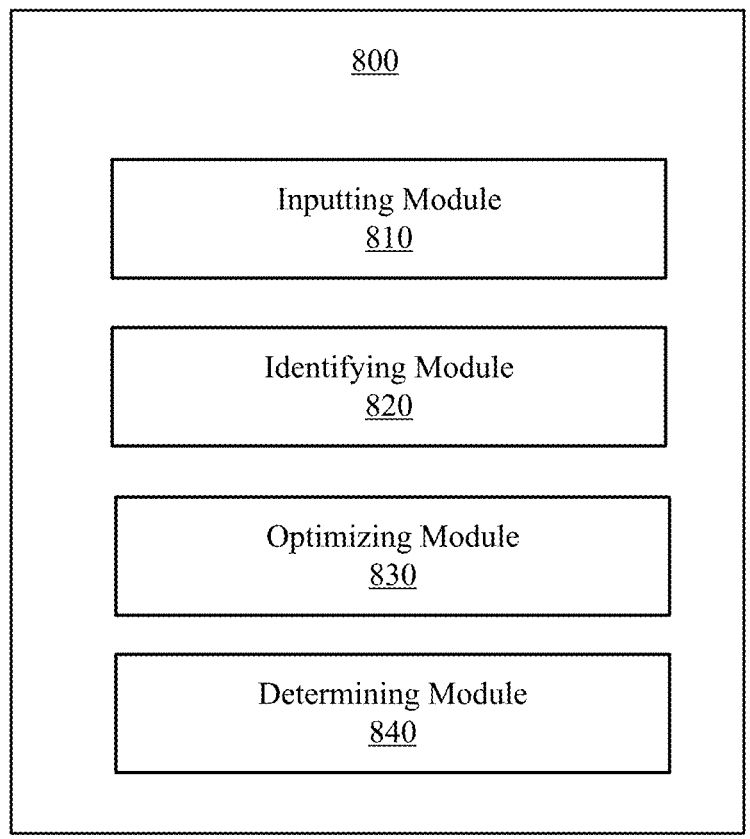
FIG. 8 illustrates a block diagram of a computer system for determining routing in accordance with some embodiments.

FIG. 8 illustrates a block diagram of a computer system 800 for determining routing in accordance with some embodiments. The components of the computer system 800 presented below are intended to be illustrative. Depending on the implementation, the computer system 800 may include additional, fewer, or alternative components.

The computer system may be an exemplary implementation of the system, operations, methods shown in FIGS. 1-7. The computer system 800 may comprise one or more processors and one or more non-transitory computer-readable storage media (e.g., one or more memories) coupled to the one or more processors and configured with instructions executable by the one or more processors to cause the system or device (e.g., the processor) to perform the above-described methods, e.g., the method 700. The computer system 800 may comprise various units/modules corresponding to the instructions (e.g., software instructions).

In some embodiments, the computer system 800 may be referred to as an apparatus for determining routing. The apparatus may comprise an inputting module 810, an identifying module 820, an optimizing module 830, and a determining module 840. In some embodiments, the inputting module 810 may input a plurality of to-be-optimized routing solution candidates to a Siamese neural network comprising a plurality of value prediction networks, each of the value prediction networks being trained to predict a cost associated with a to-be-optimized routing solution candidate. In some embodiments, the identifying module 820 may identify one or more to-be-optimized routing solution candidates from the plurality of to-be-optimized routing solution candidates based on outputs of the Siamese neural network. In some embodiments, the optimizing module 830 may input the one or more identified to-be-optimized routing solution candidates to a routing optimizer to obtain one or more optimized routing solution candidates. In some embodiments, the determining module 840 may determine an optimized routing solution with a lowest cost from the one or more optimized routing solution candidates.

Figure 9:
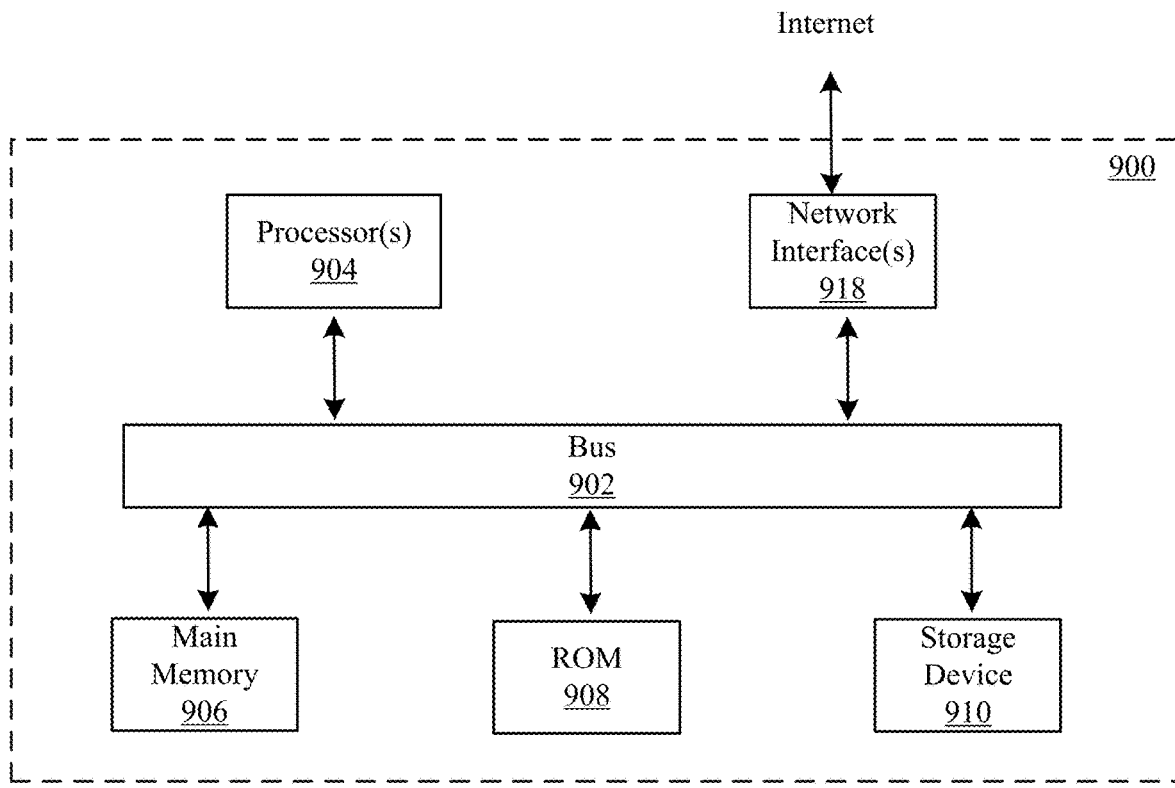
FIG. 9 illustrates a block diagram of a computer system in which any of the embodiments described herein may be implemented.

FIG. 9 illustrates a block diagram of a computer system 900 in which any of the embodiments described herein may be implemented. The computer system 900 may be implemented in any of the components of the environments or systems illustrated in FIGS. 1-8. One or more of the example methods illustrated by FIGS. 1-8 may be performed by one or more implementations of the computer system 900.

The computer system 900 may include a bus 902 or other communication mechanism for communicating information, one or more hardware processor(s) 904 coupled with bus 902 for processing information. Hardware processor(s) 904 may be, for example, one or more general purpose microprocessors.

The computer system 900 may also include a main memory 906, such as a random-access memory (RAM), cache and/or other dynamic storage devices, coupled to bus 902 for storing information and instructions executable by processor(s) 904. Main memory 906 also may be used for storing temporary variables or other intermediate information during execution of instructions executable by processor(s) 904. Such instructions, when stored in storage media accessible to processor(s) 904, render computer system 900 into a special-purpose machine that is customized to perform the operations specified in the instructions. The computer system 900 may further include a read only memory (ROM) 908 or other static storage device coupled to bus 902 for storing static information and instructions for processor(s) 904. A storage device 910, such as a magnetic disk, optical disk, or USB thumb drive (Flash drive), etc., may be provided and coupled to bus 902 for storing information and instructions.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the operations, methods, and processes described herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 may cause processor(s) 904 to perform the process steps described herein. In alternative embodiments, hard-wired circuitry may be used in place of or in combination with software instructions.

The main memory 906, the ROM 908, and/or the storage device 910 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 900 may include a network interface 918 coupled to bus 902. Network interface 918 may provide a two-way data communication coupling to one or more network links that are connected to one or more local networks. For example, network interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicate with a WAN). Wireless links may also be implemented. In any such implementation, network interface 918 may send and receive electrical, electromagnetic or optical signals that carry digital data streams representing various types of information.

The computer system 900 can send messages and receive data, including program code, through the network(s), network link and network interface 918. In the Internet example, a server might transmit a requested code for an application program through the Internet, the ISP, the local network and the network interface 918.

The received code may be executed by processor(s) 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

What is claimed is:

1. A computer-implemented method for determining routing, comprising:
    receiving a navigation request from a user through a map application, the navigation request comprising a plurality of locations;
    obtaining a plurality of training routing solutions, wherein each of the plurality of training routing solutions comprises one or more routes through the plurality of locations;
    inputting the plurality of training routing solutions to an routing optimizer to obtain a plurality of training scores, wherein the routing optimizer comprises a set of improvement operators performing one or more of following operations: changing an order of at least two of the plurality of locations in one of the one or more routes, and moving a location from one of the one or more routes to another one of the one or more routes;
    for each of the plurality of training routing solutions, extracting a set of solution-specific features;
    inputting the plurality of training routing solutions and the plurality of sets of solution-specific features to a value prediction network to generate a plurality of predicted scores;
    training the value prediction network based on the plurality of training scores and the plurality of predicted scores until an exit condition is satisfied;
    inputting a plurality of unoptimized routing solution candidates for a routing task into the trained value prediction network;
    determining one of the plurality of unoptimized routing solution candidates with a highest predicted score according to the trained value prediction network;
    feeding the one unoptimized routing solution candidate to the routing optimizer for obtaining an optimized routing as a solution to the routing task; and
    displaying the optimized routing solution to the map application for navigation.

2. The method of claim 1, wherein the exit condition comprises: a difference between a predicted score generated by the trained value prediction network for a given routing solution candidate and a training score of an optimized routing solution produced by the routing optimizer based on the given routing solution candidate is within an error margin.

3. The method of claim 1, wherein the set of solution-specific features for one of the plurality of training routing solutions comprises one or more of the following:
    a sum of distances of the routes in the training routing solution; and
    a standard deviation of the routes in the training routing solution.

4. The method of claim 1, further comprising:
    filtering the plurality of training routing solutions by:
        for a first training routing solution and a second training routing solution in the plurality of training routing solutions, determining whether a difference between the corresponding training scores of the first training routing solution and the second training routing solution is greater than a preset threshold; and
        if not, removing at least one of the first training routing solution and the second training routing solution from the training set.

5. The method of claim 1, wherein the value prediction network comprises:
   a bidirectional Long Short-Term Memory (LSTM) layer comprising a plurality of LSTM units;
   an attention layer for embedding outputs from the plurality of LSTM units; and
   an output layer for generating a training score based on an output from the attention layer and a plurality of features associated with an unoptimized routing solution candidate.

6. The method of claim 1, wherein the set of improvement operators in the routing optimizer are learned based on a reinforcement learning algorithm.

7. The method of claim 1, wherein the selecting, based on the trained value prediction network, one routing solution candidate from a plurality of unoptimized routing solution candidates for the routing optimizer to optimize comprises:
   constructing a Siamese neural network by combining a plurality of the value prediction networks;
   inputting the plurality of unoptimized routing solution candidates to the Siamese neural network to obtain a plurality of scores generated by the plurality of the value prediction networks in the Siamese neural network;
   identifying a routing solution candidate from the plurality of unoptimized routing solution candidates based on the plurality of scores; and
   inputting the identified routing solution candidate into the routing optimizer to obtain an optimized routing solution.

8. The method of claim 7, wherein the inputting the plurality of unoptimized routing solution candidates to the Siamese neural network to obtain a plurality of scores comprises:
   for each unoptimized routing solution candidate:
      pairing the unoptimized routing solution candidate with each other unoptimized routing solution candidate of the plurality of unoptimized routing solution candidates that is different from the unoptimized routing solution candidate; and
      inputting the unoptimized routing solution candidate and the paired each other unoptimized routing solution candidate into two of the value prediction networks to determine an individual score of the unoptimized routing solution candidate.

9. The method of claim 8, wherein the inputting the unoptimized routing solution candidate and the paired each other unoptimized routing solution candidate into the two value prediction networks to determine the individual score of the unoptimized routing solution candidate comprises:
   obtaining a first score for the unoptimized routing solution candidate and a second score for the paired each other unoptimized routing solution candidate;
   determining a positive score for the unoptimized routing solution candidate if the first score is greater than the second score; and
   determining a non-positive score for the unoptimized routing solution candidate if the first score is not greater than the second score.

10. The method of claim 8, wherein the identifying a routing solution candidate from the plurality of unoptimized routing solution candidates based on the plurality of scores comprises:
   for each unoptimized routing solution candidate of the plurality of the unoptimized routing solution candidates:
      determining an overall score for the unoptimized routing solution candidate comprising a sum of the individual scores of the unoptimized routing solution candidate; and
   identifying an unoptimized routing solution candidate from the plurality of unoptimized routing solution candidates with a highest overall score.

11. A system for determining routing, comprising one or more processors and one or more non-transitory computer-readable memories coupled to the one or more processors and configured with instructions executable by the one or more processors to cause the system to perform operations comprising:
   receiving a navigation request from a user through a map application, the navigation request comprising a plurality of locations;
   obtaining a plurality of training routing solutions, wherein each of the plurality of training routing solutions comprises one or more routes through the plurality of locations;
   inputting the plurality of training routing solutions to an routing optimizer to obtain a plurality of training scores, wherein the routing optimizer comprises a set of improvement operators performing one or more of following operations: changing an order of at least two of the plurality of locations in one of the one or more routes, and moving a location from one of the one or more routes to another one of the one or more routes;
   for each of the plurality of training routing solutions, extracting a set of solution-specific features;
   inputting the plurality of training routing solutions and the plurality of sets of solution-specific features to a value prediction network to generate a plurality of predicted scores;
   training the value prediction network based on the plurality of training scores and the plurality of predicted scores until an exit condition is satisfied;
   inputting a plurality of unoptimized routing solution candidates for a routing task into the trained value prediction network;
   determining one of the plurality of unoptimized routing solution candidates with a highest predicted score according to the trained value prediction network;
   feeding the one unoptimized routing solution candidate to the routing optimizer for obtaining an optimized routing as a solution to the routing task; and
   displaying the optimized routing solution to the map application for navigation.

12. The system of claim 11, wherein the operations further comprise:
   filtering the plurality of training routing solutions by:
      for a first training routing solution and a second training routing solution in the plurality of training routing solutions, determining whether a difference between the corresponding training scores of the first training routing solution and the second training routing solution is greater than a preset threshold; and
      if not, removing at least one of the first training routing solution and the second training routing solution from the training set.

13. The system of claim 11, wherein the value prediction network comprises:
   a bidirectional Long Short-Term Memory (LSTM) layer comprising a plurality of LSTM units;
   an attention layer for embedding outputs from the plurality of LSTM units; and an output layer for generating a training score based on an output from the attention layer and a plurality of features associated with a unoptimized routing solution candidate.

14. The system of claim 11, wherein the selecting, based on the trained value prediction network, one routing solution candidate from a plurality of unoptimized routing solution candidates for the routing optimizer to optimize comprises:
constructing a Siamese neural network by combining a plurality of the value prediction networks;
inputting the plurality of unoptimized routing solution candidates to the Siamese neural network to obtain a plurality of scores generated by the plurality of the value prediction networks in the Siamese neural network;
identifying a routing solution candidate from the plurality of unoptimized routing solution candidates based on the plurality of scores; and
inputting the identified routing solution candidate into the routing optimizer to obtain an optimized routing solution.

15. The system of claim 14, wherein the inputting the plurality of unoptimized routing solution candidates to the Siamese neural network to obtain a plurality of scores comprises:
for each unoptimized routing solution candidate:
pairing the unoptimized routing solution candidate with each other unoptimized routing solution candidate of the plurality of unoptimized routing solution candidates that is different from the unoptimized routing solution candidate; and
inputting the unoptimized routing solution candidate and the paired each other unoptimized routing solution candidate into two of the value prediction networks to determine an individual score of the unoptimized routing solution candidate.

16. A non-transitory computer-readable storage medium for determining routine, configured with instructions executable by one or more processors to cause the one or more processors to perform operations comprising:
receiving a navigation request from a user through a map application, the navigation request comprising a plurality of locations;
obtaining a plurality of training routing solutions, wherein each of the plurality of training routing solutions comprises one or more routes through the plurality of locations;
inputting the plurality of training routing solutions to an routing optimizer to obtain a plurality of training scores, wherein the routing optimizer comprises a set of improvement operators performing one or more of following operations: changing an order of at least two of the plurality of locations in one of the one or more routes, and moving a location from one of the one or more routes to another one of the one or more routes;
for each of the plurality of training routing solutions, extracting a set of solution-specific features;
inputting the plurality of training routing solutions and the plurality of sets of solution-specific features to a value prediction network to generate a plurality of predicted scores;
training the value prediction network based on the plurality of training scores and the plurality of predicted scores until an exit condition is satisfied;
inputting a plurality of unoptimized routing solution candidates for a routing task into the trained value prediction network;
determining one of the plurality of unoptimized routing solution candidates with a highest predicted score according to the trained value prediction network;
feeding the one unoptimized routing solution candidate to the routing optimizer for obtaining an optimized routing as a solution to the routing task; and
displaying the optimized routing solution to the map application for navigation.

17. The storage medium of claim 16, wherein the value prediction network comprises:
a bidirectional Long Short-Term Memory (LSTM) layer comprising a plurality of LSTM units;
an attention layer for embedding outputs from the plurality of LSTM units; and
an output layer for generating a training score based on an output from the attention layer and a plurality of features associated with a unoptimized routing solution candidate.

18. The storage medium of claim 16, wherein the selecting, based on the trained value prediction network, one routing solution candidate from a plurality of unoptimized routing solution candidates for the routing optimizer to optimize comprises:
constructing a Siamese neural network by combining a plurality of the value prediction networks;
inputting the plurality of unoptimized routing solution candidates to the Siamese neural network to obtain a plurality of scores generated by the plurality of the value prediction networks in the Siamese neural network;
identifying a routing solution candidate from the plurality of unoptimized routing solution candidates based on the plurality of scores; and
inputting the identified routing solution candidate into the routing optimizer to obtain an optimized routing solution.

19. The storage medium of claim 18, wherein the inputting the plurality of unoptimized routing solution candidates to the Siamese neural network to obtain a plurality of scores comprises:
for each unoptimized routing solution candidate:
pairing the unoptimized routing solution candidate with each other unoptimized routing solution candidate of the plurality of unoptimized routing solution candidates that is different from the unoptimized routing solution candidate; and
inputting the unoptimized routing solution candidate and the paired each other unoptimized routing solution candidate into two of the value prediction networks to determine an individual score of the unoptimized routing solution candidate.

* * * * *